United States Patent [19]

Spresser et al.

[11] 4,217,711
[45] Aug. 19, 1980

[54] ADVERTISING DISPAY UNIT FOR SHOPPING CARTS

[75] Inventors: Howard L. Spresser, St. Louis Park; Darrell W. Miller, Golden Valley, both of Minn.

[73] Assignee: Advocart, Inc., St. Louis Park, Minn.

[21] Appl. No.: 876,279

[22] Filed: Feb. 9, 1978

[51] Int. Cl.$^2$ .............................................. G09F 3/00
[52] U.S. Cl. ...................................... 40/308; 40/159; 40/16
[58] Field of Search ............... 40/10 D, 16, 16.2, 16.4, 40/16.6, 308, 159, 10 A, 16 R, 124.2

[56] References Cited

U.S. PATENT DOCUMENTS

| | | | |
|---|---|---|---|
| 1,465,244 | 8/1923 | Hager | 40/10 D |
| 1,803,234 | 4/1931 | Clark | 40/10 A |
| 2,723,474 | 11/1955 | Minter | 40/308 X |
| 2,725,913 | 12/1955 | Horwin | 40/16 X |
| 3,029,537 | 4/1962 | Hopp et al. | 40/308 X |
| 3,533,178 | 10/1970 | Strohmaier | 40/10 A |
| 4,024,660 | 5/1977 | Goto | 40/308 |
| 4,079,530 | 3/1978 | Atherton et al. | 40/16.4 |

*Primary Examiner*—Louis G. Mancene
*Assistant Examiner*—Wenceslao J. Contreras
*Attorney, Agent, or Firm*—Merchant, Gould, Smith, Edell, Welter & Schmidt

[57] ABSTRACT

An advertising display unit for use with a shopping cart, said display unit having a flat base member mountable on the shopping cart, a cover member releasably securable to the base member, the base member and the cover member being configured to define a slot between them. The slot can be divided into a plurality of pockets to hold advertising material, each of the pockets having a window to display the advertising material.

14 Claims, 7 Drawing Figures

U.S. Patent     Aug. 19, 1980     4,217,711
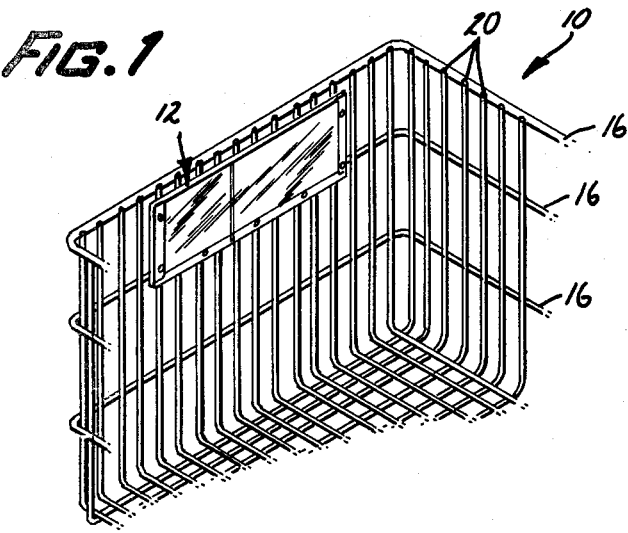
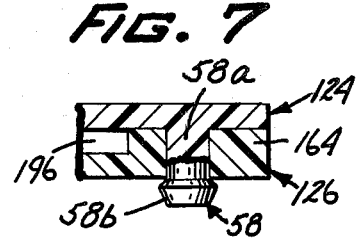
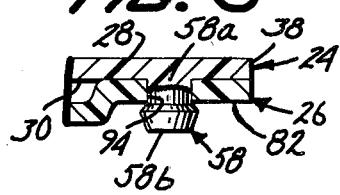
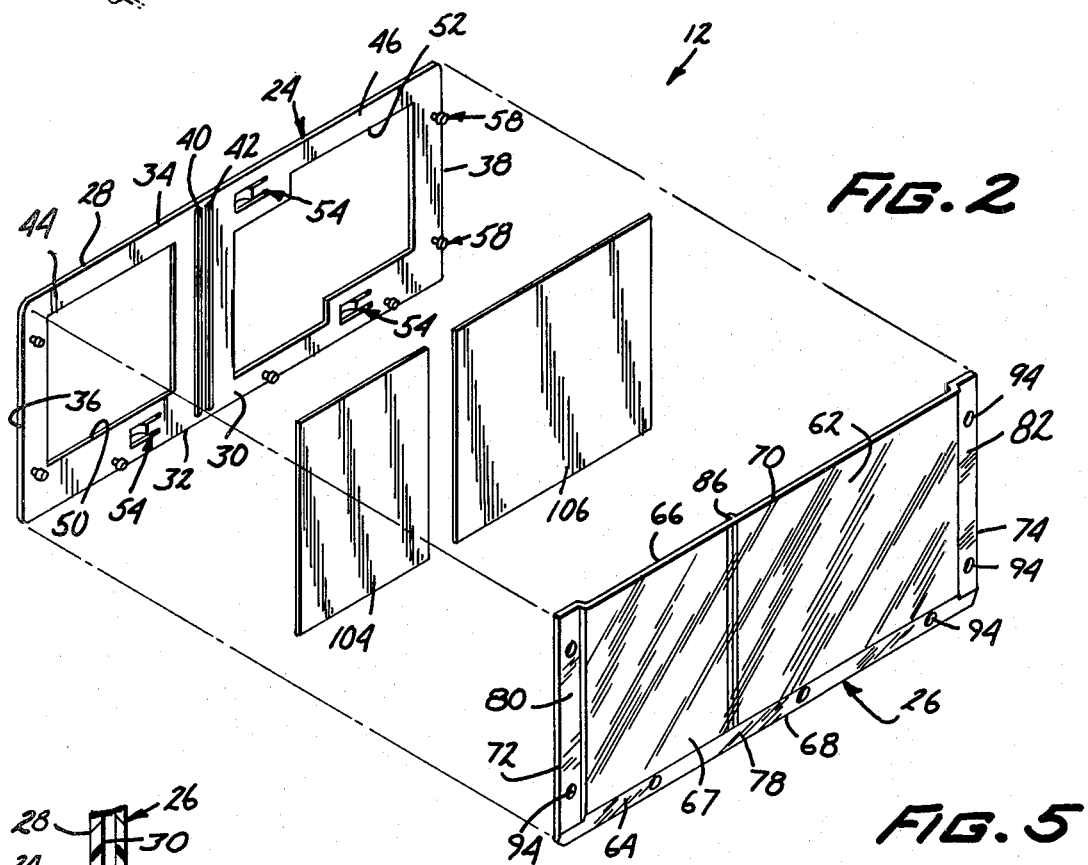
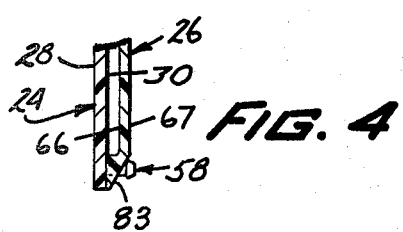
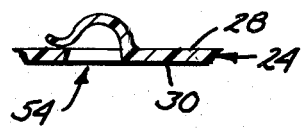
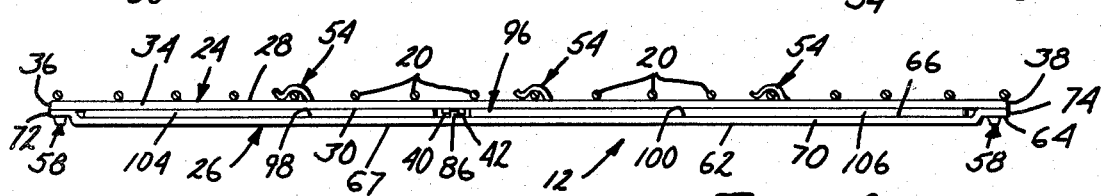

ADVERTISING DISPAY UNIT FOR SHOPPING CARTS

BACKGROUND OF THE INVENTION

1. Field of the Invention

This invention relates to advertising display units, and in particular, a novel advertising display unit for use with a shopping cart.

2. Description of the Prior Art

It is known in the art to mount advertising display units for holding advertising material on shopping carts and the like. One example of such a display unit is described in the patent to Goto, U.S. Pat. No. 4,024,660 issued May 24, 1977. The display unit of Goto utilizes a rectangular back and a window and lip made of transparent flexible plastic material which are heat sealed about the edges of the back so as to define an interior pocket area into which printed matter in the nature of advertisements and the like may be inserted or removed. The back is secured to the shopping cart by using a plurality of straps having snap fasteners so that the display unit can be secured to and removed from the cart.

Another example of a display holder for use with a shopping cart is disclosed in the patent to Hendrick, U.S. Pat. No. 3,088,236 issued May 7, 1963. The display unit of Hendrick generally comprises a back panel on which is mounted a plurality of members which form a frame for securing a display sheet to the back pannel. The back pannel is secured to the shopping cart by a pair of transversely overlapping springs which are secured to the back panel by means of a plurality of eyelets.

Another advertising and display holder for shopping carts is described in the patent to Routzahn et at, U.S. Pat. No. 3,609,893 issued Oct. 5, 1971. In Routzahn et al, the display unit generally comprises a support piece of generally rigid material and a transparent sheet which is secured to the support piece by means of a pair of bumpers having slots for snugly receiving the side edges of the transparent sheet and support piece. The transparent sheet and the support piece serve to define a slot for receiving a card or advertising member. The display unit is mounted on the shopping cart by use of a pair of keepers pivotally mounted on the support piece and having means to urge or bias them into their proper position.

Another display device for nestable type shopping carts is disclosed in the patent to Hedu, U.S. Pat. No. 3,677,570 issued July 18, 1972. The display device of Hedu generally comprises two display panels connected together to form a slot for mounting on the shopping cart. Each display panel is capable of mounting some form of message or material and is provided with a window frame having mounted therein a transparent plate which is swung open in order to insert or remove material. Means are also provided so that the display unit can be raised or retracted on the wall of the shopping cart on which it is mounted.

The foregoing display units have a number of disadvantages. For example, in Goto and Hedu, if the transparent material is scratched or broken, there is no easy method of replacing it other than by procuring another display unit. Also, as exemplified by the patent to Routzahn et al and Hendrick, these display units can be fairly complex and require expensive and not readily available materials. Although Hedu does provide for displaying two messages or cards, none of the above patents disclose a simple method for providing a plurality of pockets for ready insertion of a plurality of display cards or advertisements which can be easily viewed at one time.

SUMMARY OF THE INVENTION

We have invented a novel device of displaying advertising material on shopping carts, particularly carts constructed of a meshwork of horizontal and vertically disposed rods, which device can be easily manufactured and made from readily available materials. Our invention includes a simple means for dividing the display unit into a plurality of pockets for receiving advertising material and the like which can be viewed at the same time. The display unit can be easily disassembled for replacing parts that have been damaged or broken.

The display unit generally comprises a flat base member, means for mounting the base member on the shopping cart, a cover member and means for mounting the cover member on the base member such that the cover member can be readily disassembled from the base member, the base member and the cover member being formed so as to define a recess between them. Means are also provided for dividing the recess into a plurality of pockets to hold advertising material, each of the pockets having a window to display the advertising material. The pockets are formed such that they are open at one edge so that the advertising material may be readily and easily inserted or removed. Materials contemplated for forming the base member and the cover member include rigid plastic material, the cover member being preferably formed from a transparent plastic material.

BRIEF DESCRIPTION OF THE DRAWING

FIG. 1 is a view in perspective showing a preferred embodiment of display unit of the instant invention mounted on an interior wall of a shopping cart;

FIG. 2 is an enlarged and exploded view of the display unit;

FIG. 3 is a fragmentary view showing means by which the cover member is secured to the base member;

FIG. 4 is a fragmentary side view showing the bottom of the cover member;

FIG. 5 is a fragmentary view of the display unit showing the brackets for securing the base member to the shopping cart;

FIG. 6 is a top plan view, partially in section, of the display unit mounted on the shopping cart; and FIG. 7 is a fragmentary view of a second embodiment of the display unit.

DESCRIPTION OF THE PREFERRED EMBODIMENT

Referring to the drawing, FIG. 1 shows a shopping cart 10 having mounted on the inside front wall thereof a display unit 12 according to the instant invention. The cart 10 is shown as comprising a meshwork of horizontally disposed rods 16 and vertically disposed rods 20.

Referring now to FIG. 2, display unit 12 generally comprises a flat, sheet-like, rectangular base member 24 made from rigid plastic material, and a generally rectangular cover member 26 having approximately the same dimensions as base member 24 and made from rigid plastic transparent material. Base member 24 has opposing sides 28 and 30 and has a bottom edge 32, a top edge 34, and opposite side edges 36 and 38. Extending outwardly from side 30 are a pair of spaced parallel ridges 40 and 42. Ridges 40 and 42 run from near top edge 34 to near bottom edge 32 and parallel to side edges 36 and 38. Ridges 40 and 42 are positioned nearer one side edge than the other side edge so as to define a small portion 44 and a large portion 46 of side 30. In order to conserve on the amount of material used for base member 24, portions of base member 24 can be cut out on either side of ridges 40 and 42 as shown at spaces 50 and 52.

As shown in FIGS. 2 and 5, a plurality of curved hook-like brackets 54 are formed in side 28. Alternatively, the brackets 54 may be adhesively or otherwise secured to side 28. As shown in FIG. 6, brackets 54 are spaced and positioned so that they may be secured onto different vertical rods 20 to mount base member 24 on cart 10. Brackets 54 are preferably disposed along side 28 near top edge 34 and near bottom edge 32 of base member 24.

As shown in FIGS. 2 and 3, a plurality of lugs 58 are formed in base member 24. Lugs 58 project outwardly from side 30 and are disposed along rear side edges 36 and 38 and bottom edge 32 of base member 24. Each lug 58 has a first diameter portion 58a extending from the base member and an enlarged head portion 58b spaced from the base member 24.

As shown in FIG. 2, cover member 26 generally comprises a rectangular planar main body portion 62 and a U-shaped frame-like edge portion 64. Main body portion 62 has an inner surface 63, an outer surface 67, a bottom edge 68, a top edge 70, and opposed side edges 72 and 74. Frame-like edge portion 64 includes a bottom portion 78 and side portion 80 and 82 which are offset from the plane defined by main body portion 62. Edge portion 64 extends outwardly from the bottom and side edges of main body portion 62 and lies in a plane parallel to the plane defined by main body portion 62.

Because display unit 12 is normally mounted on a wall of cart 10 which folds downwardly such that groceries can be slided over it onto the counter, bottom portion 78 of frame-like edge 64 is preferably beveled at 83 as shown in FIG. 4 so that it will not disrupt the movement of groceries thereover.

Formed in main body portion 62 is a protruding ridge 86 running from top edge 70 to bottom edge 68 parallel to side edges 72 and 74. Ridge 86 is positioned so that it will fit between parallel ridges 40 and 42 formed in side 30 of base member 24. Ridge 86 also divides main body portion 64 into a small display window 90 and a large display window 92.

A plurality of holes 94 are formed in frame-like edge 64. Holes 94 are positioned so as to receive lugs 58 of base member 24. The diameter of holes 94 is slightly smaller than the diameter of head portions 58b, but each hole is large enough so that it can be snap fitted over a corresponding lug.

As shown in FIG. 6, lugs 58 are snap fitted into holes 94 so that frame-like edge 64 is in generally flat, face to face contact with side 30 of base member 24. With the base member and cover member so connected, main body portion 62 is displaced from side 30 such that a recess or slot 96 is formed between base member 24 and cover member 26. Ridge 86 and parallel ridges 40 and 42 which receive ridge 86 serve to divide slot 96 into a small pocket 98 and a large pocket 100 for receiving advertising or display cards 104 and 106 from the open top edge thereof.

A second embodiment of the display unit is shown in FIG. 7. In this second embodiment, cover member 126 is the same size as the base member 124. A U-shaped frame-like spacer portion 164 extends along one side of cover member 126 adjacent the bottom edge and side edges of cover member 126 so as to define recess 196 between base member 124 and cover member 126. It is preferable that spacer portion 164 be formed integrally with cover member 126.

As can be seen from the foregoing description, Applicants have invented a new and useful advertising display unit which can be made easily and inexpensively from readily available materials, and which can be readily secured to most currently used shopping carts in a position for viewing by the operator of the cart. The same display unit can be mounted on the outside of a shopping cart for viewing by both the user of the cart and by other persons in the area. The advertising material in the unit can be quickly and easily replaced when outdated

We claim:

1. An advertising display unit for use with a shopping cart, comprising:
   a flat base member of rigid material;
   a cover member of rigid material with dimensions similar to said base member, comprising a main body portion with inner and outer surfaces and a generally U-shaped, frame-like edge portion extending from said main body portion and located in a plane offset from a plant defined by said main body portion;
   means for mounting said cover member on said base member with said U-shaped edge portion in contact with said base member and with said main body portion spaced therefrom to define a recess therebetween and an open slot along one edge thereof;
   ridge means for dividing said recess into a plurality of adjacent pockets to hold advertising material, said ridge means extending from each member and overlapping to seal said pockets from one another;
   at least the portions of said cover member disposed over said pockets being transparent to display said advertising material; and
   means for mounting said base member and attached cover member on said cart with said open slot facing upwardly to permit insertion of advertising material through said slot into said recess.

2. A display unit according to claim 1 wherein said base member and cover member have corresponding upper and lower edges, and wherein said ridge means comprises a first ridge projecting outwardly from one of said base and cover member and extending between said upper and lower edges.

3. A display unit according to claim 2 wherein said ridge means further comprises a pair of outwardly projecting parallel spaced ridges formed in the other of said base member and lower member, said first ridge fitting between said spaced ridges.

4. A display unit according to claim 1 wherein said cover member mounting means comprises a plurality of holes on one of said base member and said cover member, and a like plurality of lug members carried by the other of said base member and and said cover member, said lug member being received and captured by said holes for securing said base member to said cover member.

5. A display unit according to claim 1 wherein said cover member is formed from rigid transparent material.

6. An advertising diplay unit for use with a shopping cart having rods defining a meshwork thereof, comprising:
- a base member formed from a sheet of flat material;
- means carried by said base member for releasably securing said base member to said rods;
- a cover member of dimensions similar to said base member and having a main body portion, said main body portion having inner and outer surfaces and four edges, and a generally planar, U-shaped, frame-like edge portion extending outwardly of three of said edges of said main body portion and located in a plane offset from a plane defined by said main body portion
- a plurality of lugs formed in one of said base member and said U-shaped, frame-like edge portion;
- means formed in the other of said base member and said U-shaped, frame-like edge portion for receiving and capturing said lugs to secure said U-shaped, frame-like edge portion in contact with said base member defining a slot between said base member and said main body portion;
- at least a portion of said cover member being transparent to permit viewing of advertising material positioned in said slot; and
- ridges means for dividing said recess into a plurality of adjacent pockets to hold advertising material, said ridge means extending from each member and overlapping to seal said pockets from one another.

7. A display unit according to claim 6 wherein said lugs are formed in said base member, and wherein said lug receiving means comprise a plurality of holes formed in said frame-like edge portion.

8. A display unit according to claim 6 wherein said means securing said base member to said rods comprises a plurality of hooks on said base member.

9. A display unit according to claim 8 wherein said rods include generally vertically disposed rods, wherein said hooks have a generally curved configuration and are located on the periphery of said base member and are aligned to receive said vertically disposed rods of said cart.

10. A shopping cart advertising display device for use with a shopping cart having a meshwork of rods, comprising:
- a flat generally rectangular base member having first and second opposing sides, a top and a bottom edge, and a pair of opposite side edges;
- a pair of spaced parallel ridges extending outwardly from said first side of said base member and running vertically between said bottom edge and said top edge parallel to said side edges, said parallel ridges being positioned closer to one side edge than the other side edge so as to define a small and large portion of said base member;
- a plurality of hook-like brackets on said second side of said base member and disposed along said top and bottom edges of said base member for securing said base member to said rods of said shopping cart;
- a generally rectangular transparent cover member of dimensions similar to said base member and having a generally rectangular main body portion, said main body portion having inner and outer surfaces, a top and a bottom edge, and opposite side edges, and a generally planar, U-shaped, frame-like edge portion extending outwardly of said side and bottom edges of said main body portion and located in a plane offset from and a plane defined by said main body portion;
- means for securing said cover member to said base member with said frame-like edge portion in contact with said first side of said base member and with said main body portion being spaced therefrom;
- said cover member and said base member defining a slot open along said top edges and having the dimensions of said main body portion;
- a ridge extending outwardly from the inner surface of said main body portion and running vertically between said top edge and said bottom edge of said main body portion, said main body portion ridge being positioned so as to fit between said parallel ridges of said base member to divide said main body portion into a large and a small window; and
- said main body portion ridge and said parallel ridges dividing said slot into a large and a small pocket adapted to receive advertising material.

11. A shopping cart advertising display device for use with a shopping cart having a meshwork of rods, comprising:
- a flat base member having first and second opposing sides, a top and a bottom edge, and a pair of opposite side edges;
- means for releasably securing said base member to said rods;
- a pair of spaced parallel ridges extending outwardly from said first side of said base member and substantially traversing one dimension of said base member;
- a transparent cover member of dimensions similar to said base member and having a main body portion, said main body portion having inner and outer surfaces, a top and bottom edge, and opposite side edges, and a generally planar, U-shaped, frame-like edge portion extending outwardly of three edges of said main body portion and located in a plane offset from a plane defined by said main body portion;
- means for securing said cover member to said base member with said frame-like edge portion in contact with said first side of said base member and with said main body portion being spaced therefrom;
- said cover member and said base member defining a slot open along one edge transverse to said parallel ridges and having the dimensions of said main body portion;
- a ridge extending outwardly from the inner surface of said main body portion and substantially traversing one dimension of said main body portion, said main body portion ridge being positioned so as to fit between said parallel ridges of said base member; and
- said main body portion ridge and said parallel ridges dividing said slot into pockets adapted to receive advertising material.

12. A display device according to claim 11 wherein said means for securing said base member to said rods comprises a plurality of hooks on said base member.

13. A display device according to claim 8 wherein the rods are generally vertically disposed, and wherein said hooks having a generally curved configuration and are located on the periphery of said base member and are aligned to receive said vertically disposed rods of said cart.

14. A display device according to claim 11 wherein said ridges extend generally vertically and are positioned closer to one side edge than the other side edge so as to define a large and a small advertising material pocket.

* * * * *